United States Patent [19]

Freudenreich

[11] Patent Number: 4,922,388

[45] Date of Patent: May 1, 1990

[54] VEHICLE HEADLIGHT

[75] Inventor: Erwin Freudenreich, Lippstadt, Fed. Rep. of Germany

[73] Assignee: Hella KG Hueck & Co., Lippstadt, Fed. Rep. of Germany

[21] Appl. No.: 382,285

[22] Filed: Jul. 20, 1989

[30] Foreign Application Priority Data

Aug. 1, 1988 [DE] Fed. Rep. of Germany ....... 3826106

[51] Int. Cl.[5] .............................................. B60Q 1/04

[52] U.S. Cl. ........................................ 362/61; 362/80; 362/457; 362/226; 362/396

[58] Field of Search .................. 362/61, 80, 226, 396, 362/418, 440, 444, 457

[56] References Cited

U.S. PATENT DOCUMENTS

| | | | |
|---|---|---|---|
| 4,670,822 | 6/1987 | Baker | 362/61 |
| 4,682,274 | 7/1987 | Freudenreich et al. | 362/61 |
| 4,760,506 | 7/1988 | Mochizuki et al. | 362/61 |
| 4,819,133 | 4/1989 | Kochi et al. | 362/61 |
| 4,841,419 | 6/1989 | Ohishi | 362/61 |

FOREIGN PATENT DOCUMENTS

| | | | |
|---|---|---|---|
| 1902362 | 9/1969 | Fed. Rep. of Germany . | |
| 1539393 | 1/1970 | Fed. Rep. of Germany . | |
| 2925920 | 3/1980 | Fed. Rep. of Germany | 362/457 |
| 2853227 | 6/1980 | Fed. Rep. of Germany | 362/457 |
| 2939328 | 4/1981 | Fed. Rep. of Germany | 362/457 |
| 3602234 | 7/1987 | Fed. Rep. of Germany . | |
| 3729984 | 2/1989 | Fed. Rep. of Germany | 362/80 |
| 2262771 | 10/1975 | France | 362/457 |
| 0145556 | 6/1985 | France | 362/457 |

*Primary Examiner*—Ira S. Lazarus

*Assistant Examiner*—Sue Hagarman

*Attorney, Agent, or Firm*—Griffin, Branigan & Butler

[57] ABSTRACT

A light bulb is mountable from a rear side of a bowl shaped headlight reflector by extending the light bulb through an opening in an apex of the reflector and rotating it less than 180 degrees. Radially protruding tongues of a plate shaped socket of the light bulb slide under a ring formed element during the mounting. The ring formed element is constructed of spring wire having a polygonal shape. The number of angles of the polygonal-shaped wire is the same as the number of tongues of the socket. The polygonal-shaped wire engages the reflector at its corners, or angles, and the middle of each side thereof is biased to tightly engage a tongue of the socket.

22 Claims, 3 Drawing Sheets

VEHICLE HEADLIGHT

BACKGROUND OF THE INVENTION

This invention relates broadly to the art of vehicle headlights and more specifically to a headlight in which a light bulb is mounted from a rear side of a reflector through an opening in the reflector and then rotated less than 180 degrees to slide radial tongues of a plate shaped socket of the light bulb between the reflector and a ring-formed element mounted on the rear side of the reflector.

Such a headlight for a vehicle is disclosed in U.S. Pat. No. 4,682,274 to Freudenreich et al wherein a ring formed element of sheet metal is disclosed. This ring formed element has bent tabs at its outer rim which are inserted into openings on a reflector's rear side to be self-clamped thereto. The glass cylinder, or globe, of a light bulb to be mounted is inserted through an opening of the reflector and radially extending tongues of a socket of the light bulb are placed into recesses of the ring formed element. Thereafter, by a small amount of clockwise rotation of the light bulb and the socket the tongues can be rotated under spring arms which are also cut about the inner circumference of the ring formed element. At the end position of the light bulb, the spring arms are biased against the tongues and pressed thereon so as to hold the socket and the light bulb against the reflector. With this arrangement, the mounting and dismounting of light bulbs is quite uncomplicated and easy since the ring formed element which holds a light bulb in place after it has been rotated does not have to have its position moved during mounting of the light bulb.

In this regard, for each of the headlights described in German Offenlegungsschrift No. 1 902 362 and Offenlegungsschrift No. 1 539 393, when changing a light bulb, a wire formed element must be removed from its holding position. However, when manufacturing the headlight of U.S. Pat. No. 4,682,274 there is a great deal of wasted sheet metal from forming these ring formed element. In any event, during manufacture, not only must the ring formed element be stamped out of sheet metal, but additional bending steps are also necessary. Still further, when these ring formed elements are stored, they can hook together.

It is, therefore, an object of the invention to provide a vehicle headlight ring formed element for mounting a light bulb to a reflector which is easy to use, which does not produce a great deal of waste during the manufacture thereof, and which is constructed of a spring material.

SUMMARY OF THE INVENTION

According to principles of this invention, a headlight includes a ring formed element of spring wire having a polygonal-shape with the same number of angles as there are tongues on a light bulb socket. The polygonal-shaped wire is mounted at its angle areas to a reflector with each side of the polygonal wire, at a middle area thereof, pressing on a respective tongue of the socket. When mounting a light bulb in the headlight of this invention, the glass cylinder of the light bulb is first inserted through an opening in a reflector of the headlight so that radially extending tongues of the socket in which the light bulb is mounted are positioned just inside the angles of the polygonal wire. After the socket is resting on a rear side of the reflector with the light bulb extending through the opening, the socket and light bulb are rotated in a clockwise direction so that the tongues are moved under the sides of the polygonal-shaped wire. The dismounting of the light bulb is accomplished by reversing this procedure.

BRIEF DESCRIPTION OF THE DRAWINGS

The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
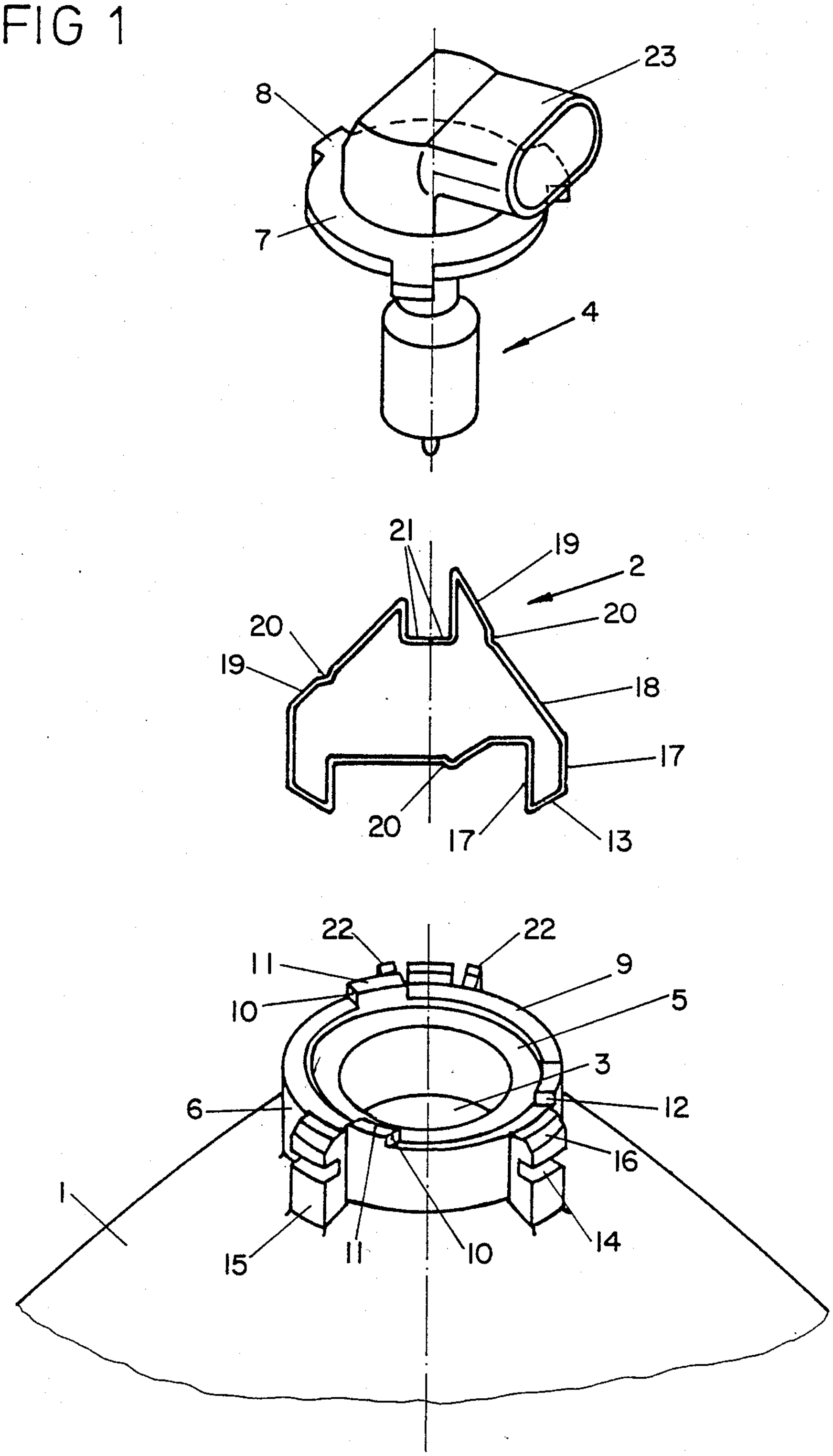
FIG. 1 is a segmented exploded perspective view of a portion of a headlight of this invention including a reflector, a polygonal wire ring formed element mountable on the reflector, and a light bulb with associated supports.

A vehicle headlight comprises a reflector 1, constructed of plastic or other material, a light shield (not shown) protecting an inner, reflecting, surface of the reflector 1, a holding element 2 (polygon-shaped ring formed element 2) constructed of a spring steel wire which is mounted on a rear, or outside, surface of the reflector 1 so as to surround an opening 3 into the reflector at the reflector's apex, and a light bulb 4 which, along with its plate shaped socket 7, or support, is mounted between the polygon-shaped ring formed element 2 and the reflector 1.

The opening 3 in the apex of the reflector 1 is surrounded by a reflector neck 6. Radially-directed, protruding support tongues 8 of the plate shaped socket 7 lie on the axially-facing surface 9 of the reflector neck 6. In one embodiment, a portion of the plate-shaped socket 7 also rests on another axially-facing surface 5 of the reflector neck 6. In an end position, or mounted position, of the light bulb 4, each of the tongues 8 lies at a stop surface 10 which is defined by an axially-directed protrusion 11 extending in the direction of the rear of the light bulb 4 from the axially-facing surface 9 of the reflector neck 6. Portions of the axially-facing surface 9 lying between the protrusions 11 serve as glide surfaces for the tongues 8 of the light bulb 4 when it is twisted or turned. The twist angle $\alpha$ is defined by the stop surface 10 and a stop surface 12 positioned at an opposite end of the glide surface on an opposite side of another protrusion 11.

Figure 2:
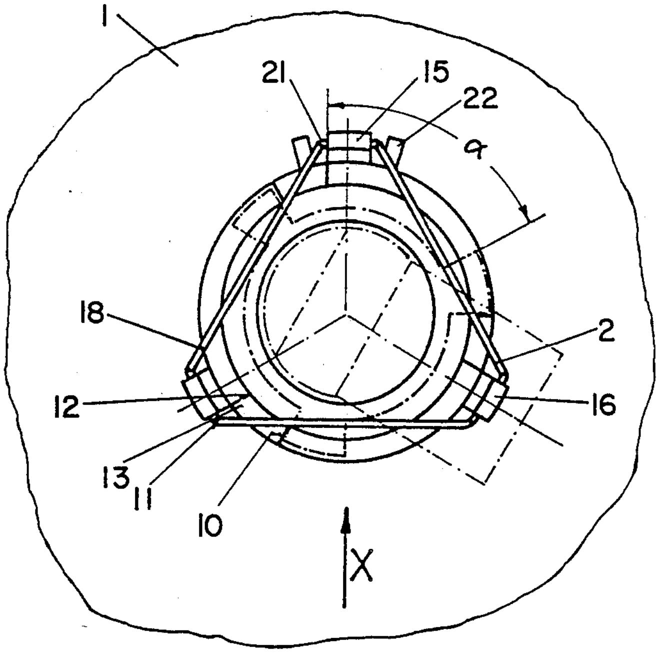
FIG. 2 is a segmented plan view of the vehicle headlight of FIG. 1 with the various elements thereof engaged with one another and showing in dashed lines different stages of operation.

Before the light bulb 4 is mounted, the ring formed element 2, which is constructed of bent spring steel wire, is placed, self-guiding, on the reflector neck 6. In a plan view of the reflector neck 6 with the ring formed element thereon, the ring formed element 2 has generally a polygonal shape which, in the depicted embodiment is in the general shape of a triangle. The angles, or corners of the triangle are blunt, or form blunt angle portions 13 defining short straight lines. These blunt angle portions 13 engage, self-guiding, indentations 14, in the form of slits, in outer surfaces of shoulders 15 formed on an outer surface of the reflector 1. Angled ramp guide surfaces 16 guide the blunt angle portions of the ring formed element 2 while it is being mounted on the reflector 1. Axial portions 17 joining the blunt angle portions 13 to sides 18 of the polygonal shaped ring formed element, which are bent to be directed toward the reflector 1, are separated from one another a greater distance than are the widths of the shoulders 15 which are positioned between them, as can be seen in FIG. 2. A first end portion 19 of each of the sides 18 which receives a respective support tongue 8 when the socket 7 is twisted, is bowed, or bent, in the axial direction away from the reflector 1. This bowing, or bending, gradually reduces the distance between the sides 18 and the axially-facing surfaces 9 in the direction in which the light bulb 4 is rotated, or twisted, in order to mount it. That is this distance gradually reduces up to the position of an axially-bowed, engaging nose 20. A supporting tongue 8 is held between an engaging nose 20 and a stop surface 10 for each side 18 to prevent an unintentional twisting of the socket 7.

One of the blunt angle portions 13 at an angle in the ring formed element 2 is formed by two, opposite, free end portions 21 of the piece of wire forming the ring formed element 2, with the free end portions 21 lying close to one another. In the FIGS. 1–3 embodiment, these free end portions 21 are permanently welded together and the axial portions 17 leading to the end portions 21 are arranged in axially oriented channels which are defined by ribs 22 and a shoulder 15 on the outer surface of the reflector neck 6.

The light bulb 4 has on the back side of the socket 7 an electrical contact (not shown) which is surrounded by an angle shaped housing plug, or receptacle, 23.

Figure 3:
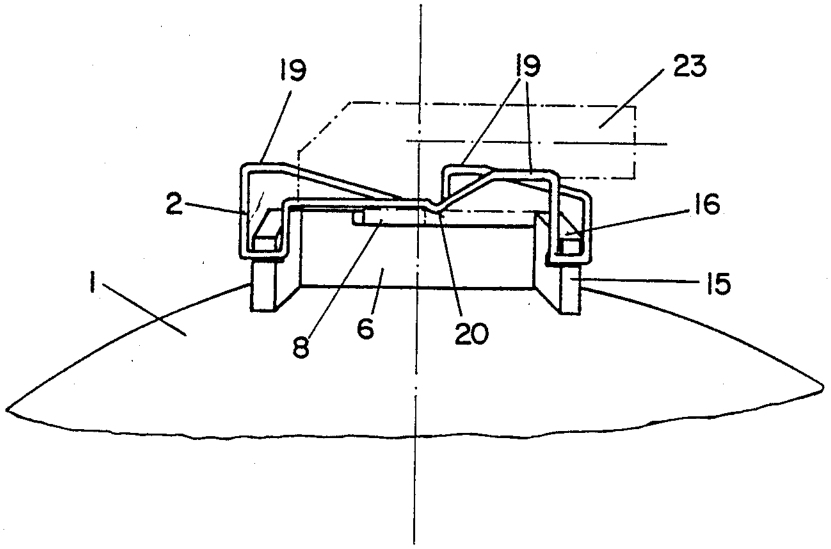
FIG. 3 is a segmented side view taken from direction X in FIG. 1 of a reflector neck.
Figure 4:
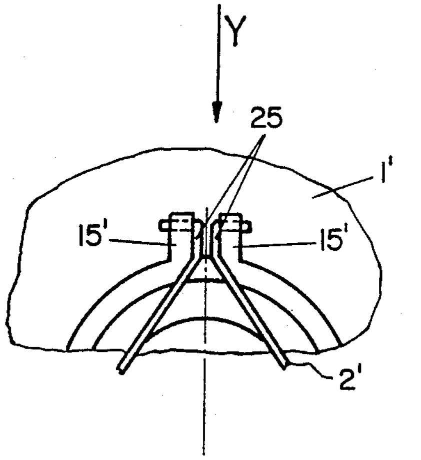
FIG. 4 is a segmented plan view of a reflector neck with a polygonal wire of an alternate embodiment.
Figure 5:
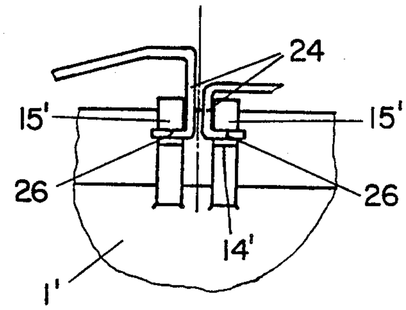
FIG. 5 is a segmented side view taken from direction Y of FIG. 4 showing the reflector neck thereof.

An alternate embodiment is depicted in the segmented partial views of FIGS. 4 and 5 of a reflector neck and ring formed element which corresponds to the embodiment of FIGS. 1–3 with the exception that it has modified free end portions of a wire forming an angle, or corner area, of a ring formed element 2' with a corresponding modified reflector neck 6'. In this regard, the reflector neck has two radial shoulders 15' rather than one, each with an indentation. Approximately in the middle of the angle area of the ring formed element 2', the free ends of the wire are bent to form first bent portions 24 directed axially toward the reflector 1' and to form second bent portions 25 which are directed radially outwardly from a polygonal shape of thiee ring formed element 2. These first and second bent portions 24 and 25 are positioned between the two shoulders 15' and the ring formed element 2 is biased so that the first wire portions 24 are urged tangentially to the reflector neck 6'. At the immediate free ends of the wire are wire portions 26 which are bent in the tangential direction away from one another so that each of these engages an indentation 14' of the respective shoulders 15'.

Such a twist-mount arrangement is particularly beneficial for mounting light bulbs having sockets with contacts which are surrounded by angle shaped housings which can be easily gripped for twisting.

In addition, it is beneficial to have blunt corners of a polygonal shaped spring wire as well as axial portions extending between sides of the polygon and the blunt corners. Such an arrangement allows the ring formed element to be self-guiding into indentations on radially directed outer surfaces of shoulders on the rear side of a reflector surrounding an opening thereinto. In this regard, it is useful to make the indentations in the form of slits and to form the shoulders on an outer surface of a reflector neck surrounding the opening. With such an arrangement, it is possible to mount the spring wire (ring formed element) without the necessity of further attaching elements. Also, this arrangement can be easily and inexpensively manufactured. In this regard, it is further beneficial to include an angled ramp glide surface on the shoulders to enhance self-guiding of the wire into its mounted position. The blunt angle portions of the polygon-shaped ring formed element slide along the angled ramp glide surfaces when the ring formed element is mounted on the rear side of the headlight until they self-guide into the slits in the shoulders.

It is also beneficial that the reflector neck includes axially oriented protrusions defining at least two stop surfaces for at least one tongue to define the turning, or twisting, angle of a light bulb. In this manner, while mounting a glass cylinder of a light bulb in an opening of the reflector neck, after the socket is lying on an axially-facing surface of the reflector, it is not possible to improperly rotate the light bulb. That is, it is not possible to rotate the socket in the clockwise or the counterclockwise direction beyond intended start and end positions.

A further benefit of this arrangement is achieved because at least one tongue of the socket can be placed between the stop surface of the protrusion defining the end mounted position of the light bulb and an axially bowed engaging nose of the ring formed element, which prevents undesired further rotation of the tongue. This solution is not only uncomplicated but it provides assurance that the light bulb cannot rotate on its own.

It is further beneficial that first end portions of each of the sides of the polygonal-shaped wire bend axially outwardly, away from the reflector 1, for receiving a tongue when the light bulb is first rotated to mount it on the reflector. In this manner, it is guaranteed that the various tongues of the socket are guided under the sides of the polygonal-shaped wire, or ring formed element.

Still further it is beneficial to have the free ends of the wire in a blunt angle, or corner, positioned adjacent one another. In this regard, it is further beneficial to have the wire in the blunt corner, which is formed by such free ends of the wire, bent in an axial direction toward the reflector to be positioned in a radially outwardly opening slot formed from a shoulder and an adjacent rib. In this manner, it is guaranteed that the sides of the polygonal-shaped spring wire ring formed element whose blunt angle portion is formed by free end portions of the spring wire do not spring out and thereby release pressure on the tongues of the socket.

In a particular beneficial embodiment of the invention the blunt adjacent free ends of the wire are permanently attached to one another. Such a permanent connection is, for example, quite easily and inexpensively manufactured by welding the two free ends together after the spring wire has been bent into the ring formed element shape. It is also possible to solder the two free ends together.

The embodiments of the invention in which an exclusive property or privilege are claimed are defined as follows:

1. In a vehicle headlight of the type having a bowl shaped reflector with an opening in an apex area of the bowl, there being a light bulb mounted in the opening from a rear, convex, side of the headlight by means of a twisting movement of less than 180 degrees, the light bulb having a plate shaped support with radially projecting support tongues at an outer periphery thereof for being gripped between the rear side of the reflector and a ring formed element; the improvement wherein:

the ring formed element is constructed of spring wire to have the shape of a polygon with the same number of sides and angles corresponding to the number of radially projecting support tongues, the ring formed element being attached to the reflector at its angle areas, with sides of the polygon-shaped ring formed element being biased to engage support tongues.

2. A vehicle headlight as in claim 1, wherein angle portions of the polygon-shaped ring formed element are blunt.

3. A vehicle headlight as in claim 2 wherein the blunt angle portions of the polygon-shaped ring formed element are bent, lateral to a plane generally defined by the sides of the polygon-shaped ring formed element, toward the reflector.

4. A vehicle headlight as in claim 3 wherein the blunt angle portions of the polygon-shaped ring formed element engage indentations on the rear side of the reflector.

5. A vehicle headlight as in claim 4 wherein the indentations are formed in radially outwardly directed surfaces of shoulders of the reflector positioned about the periphery of the opening.

6. A vehicle headlight as in claim 5 wherein the indentations are formed as slits.

7. A vehicle headlight as in claim 5 wherein the shoulders are part of an outer surface of a reflector neck surrounding the opening on the outer surface of the reflector.

8. A vehicle headlight as in claim 5 wherein each of the shoulders includes an angled glide surface for contacting a blunt angled portion of the polygon-shaped ring formed element during the mounting of the polygon-shaped ring formed element on the rear side of the reflector and guiding the blunt angled portion into its respective indentation.

9. A vehicle headlight as in claim 1 wherein the reflector includes at least two stop surfaces defined by protrusions on the rear side of the reflector for contacting at least one of the tongues for defining the angle $\alpha$ of twisting movement for mounting the light bulb.

10. A vehicle headlight as in claim 9, wherein at least one side of the polygon-shaped ring formed element has a laterally, or axially, bowed nose thereon and wherein when the light bulb is mounted in the reflector opening at least one of the tongues is positioned between one of the stop surfaces and the outwardly bowed nose to prevent unintentional rotation of the support.

11. A vehicle headlight as in claim 1 wherein a first portion of a side of the polygon-shaped ring formed element under which a tongue is first rotated for mounting the light bulb is outwardly bent, laterally, in a direction toward a rear end of the light bulb.

12. A vehicle headlight as in claim 11 wherein said outward bend of said side is slowly reduced in the twisting direction of the tongue when mounting a light bulb such that a second portion of said side, under which the tongue rests when the light bulb is fully mounted in the opening, is positioned closer to the rear surface of the reflector than the first end.

13. A vehicle headlight as in claim 5 wherein the polygon-shaped ring is formed of a piece of wire bent in the shape of a loop, or ring, with its free end portions being adjacent one another in a blunt angle portion.

14. A vehicle headlight as in claim 13 wherein free end portions of the polygon-shaped ring formed element which are bent lateral to a plane generally defined by the sides of the polygon-shaped ring, toward the reflector, are each located in axial, radially outwardly directed slots in the reflector and wherein said reflector includes such axial radially outwardly directed slots.

15. A vehicle headlight as in claim 14 wherein each of the axial, radially outwardly directed slots is defined by a shoulder and an adjacent rib.

16. A vehicle headlight as in claim 13 wherein the free ends of said piece of wire are permanently attached to one another.

17. A vehicle headlight as in claim 6 wherein the blunt angle portions of the polygon-shaped ring formed element are longer than the respective shoulder slits in which they engage.

18. A vehicle headlight as in claim 13 wherein the blunt angle portions of the free ends are positioned between first and second shoulders, each having an indentation on a radially outwardly directed surface thereof and wherein the free ends are bent at opposite bends, in opposite directions away from one another to respectively engage the indentations of the first and second shoulders.

19. A vehicle headlight as in claim 18 wherein the distance between the first and second shoulders is smaller than the distance between the opposite bends in the free ends of the wire.

20. A vehicle headlight as in claim 18 wherein the wire is biased such that the free ends thereof are urged toward respective sides of the first and second shoulders facing one another.

21. A vehicle headlight as in claim 18 wherein portions of the free ends positioned between the first and second shoulders are bent lateral to a plane generally defined by the sides of the polygon-shaped ring formed element toward the reflector.

22. A vehicle headlight as in claim 21 wherein portions of the polygin-shaped ring formed element adjacent the free ends also have radially extending portions.

* * * * *